April 9, 1929. W. J. VOELKER 1,708,528
ADJUSTABLE JOINT CONNECTION
Filed Jan. 31, 1927

Inventor
William J. Voelker
By G. C. Kennedy
Attorney

Patented Apr. 9, 1929.

1,708,528

UNITED STATES PATENT OFFICE.

WILLIAM J. VOELKER, OF WATERLOO, IOWA.

ADJUSTABLE JOINT CONNECTION.

Application filed January 31, 1927. Serial No. 164,813.

My invention relates to improvements in adjustable joint connections, and the object of my improvement is to provide a sectional joint device as an adjustable smoke-pipe connection for a furnace, whose sections may be rotated upon each other to place them at a desired angular relation, and having fastening devices adapted to secure them together in the desired relation.

Figure 1:
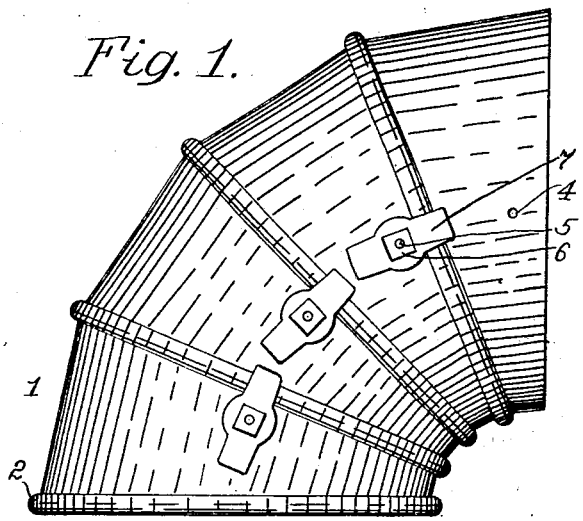
Figure 3:
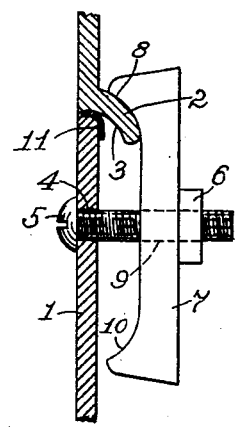
Figure 2:
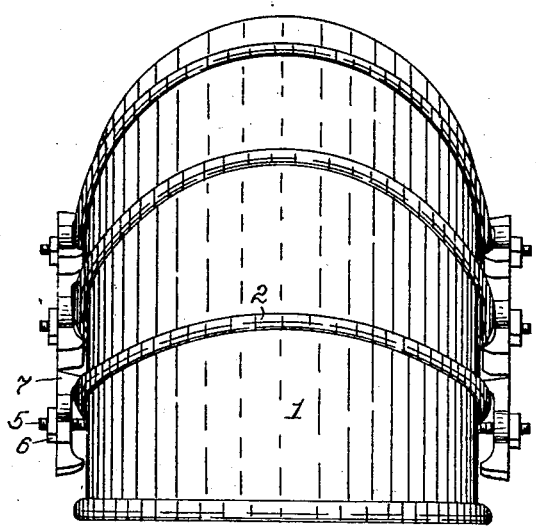

This object I have accomplished by the means which are hereinafter described and claimed, and which are illustrated in the accompanying drawings, in which Fig. 1 is a side elevation of my device and Fig. 2 is an elevation thereof taken at an angle of ninety degrees from the elevation of said Fig. 1. Fig. 3 is an enlarged fragmentary detail view of the joint between two sections as coupled together by my improved fastening means.

While the device as specifically illustrated shows it in shape and dimensions suitable for a smoke-pipe adjustable elbow connection made from sections of cast metal, yet it is obvious that these may be modified to render them suitable for any other use where an adjustable elbow joint is to be employed.

The elbow joint shown is preferably made up of assembled like sections 1, each section being a hollow cylindrical segment whose ends are positioned at a converging angle, whereby in this case four of the sections 1 when connected together become an elbow having an arc of ninety degrees. Two or more of these sections 1 may be used in order to provide an elbow of an amplitude of arc of different degree to serve the purpose required.

One end of each section is shaped with an end fillet therearound at 2 having outer and inner curvate walls 8 and 3 respectively, projecting outwardly. The other edge of each section is preferably rounded so as to thereby better fit within the inner wall curve 3 of the fillet 2 of another section placed in communication therewith. When found necessary, a packing ring 11 may be inserted to seal the joint between these abutting sections and may be shaped from any suitable material, preferably flexible to conform to and seal irregularities in the abutting edges of the sections. So sealed, the elbow may be used for the conveyance of water or other flowable materials.

The said abutted edges of sections permit relative rotation of each section upon the other for relative angular adjustment of the elbow as is evident. In order to fasten the sections together as so relatively adjusted, I make use of the following novel fastening devices.

Each section 1 has a circular aperture 4 in each diametrically opposite side, medially between the other sides having different lengths, to receive a headed bolt 5 in each instance with its stem projecting outwardly and threaded to receive a nut 6. The numeral 7 denotes a reversible or double ended clamping block of elongated shape medially apertured to seat it loosely upon the stem of the bolt 5 within said nut 6. The inner face of each block 7 has at the ends like angular projections 10, whose inner faces are arcuate to fit upon the outer curved wall 8 of a fillet 2.

Referring to said Fig. 3, it will be seen that when the block 7 is clamped in place by the nut 6, one projection 10 will fit upon the outer curved wall 8 of the fillet 2 against whose inner wall 3 the edge of the abutting section 1 is contacting, or when a packing-ring 11 is used, then the ring will be seated between said edge and the curved wall 3. The clamping action of the block 7 is such upon the joint, that the pair of oppositely positioned blocks 7 will lock the joint diametrically, while the apposition of the curved wall of the end projection 10 of the block and the curved wall 8 of the fillet 2 will cause the block to exert a longitudinal pull upon the fillet as the bolt stem 5 will pull oppositely upon the abutting section, thus clamping the sections tightly together end to end, and compressing the packing-ring 11 between them. This compound traction of the fastening devices secures the sections together in their adjusted relation, non-leakable, yet the fasteners may be readily released for a change of adjustment in the joint.

Having described my invention, what I claim as new, and desire to secure by Letters Patent, is:

An adjustable segmental elbow connection for a furnace smoke-pipe, comprising in combination a plurality of like cylindrical segments having convergent mating parts at their joints, the mating part of one segment including an outwardly directed hollowed annular rim to receive matingly the opposed rim part of the abutting segment on an interior curve of a radius permitting relative restricted angular adjustments upon each other of the mating segments without separation, the received segment having oppositely positioned boltholes, headed bolts seated in said holes with threaded stems projecting outwardly, apertured clamping blocks mounted loosely upon said stems, said annular rim having its outer face curvate with a greater radius than the curve of its inner face, said clamping blocks each having a curvate projection of the same radius of curve as and fitting over the outer curved face of the annular rim for relative sliding adjustments thereon, and nuts on said stems to secure said mating parts of the annular rim and of said block projections together in any relatively adjusted position.

In testimony whereof I affix my signature.

WILLIAM J. VOELKER.